(12) United States Patent
Seong et al.

(10) Patent No.: US 7,230,630 B2
(45) Date of Patent: Jun. 12, 2007

(54) GRAPHICS DISPLAY SYSTEMS WITH DATA COMPRESSION AND METHODS OF PERFORMING DATA COMPRESSION OF GRAPHICS DATA

(75) Inventors: Han-Soo Seong, Gyeonggi-do (KR); Soon-Jae Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 266 days.

(21) Appl. No.: 11/097,898

(22) Filed: Apr. 1, 2005

(65) Prior Publication Data

US 2005/0265614 A1    Dec. 1, 2005

(30) Foreign Application Priority Data

May 29, 2004    (KR)    ............. 10-2004-0038711

(51) Int. Cl.
| | | |
|---|---|---|
| G06T 9/00 | (2006.01) | |
| G09G 5/36 | (2006.01) | |
| G06K 9/00 | (2006.01) | |
| G06K 9/68 | (2006.01) | |
| G03F 3/00 | (2006.01) | |
| G06K 9/36 | (2006.01) | |
| G09G 5/02 | (2006.01) | |
| H04N 1/36 | (2006.01) | |

(52) U.S. Cl. .............. 345/589; 345/581; 345/549; 345/555; 382/166; 382/167; 382/232; 358/518

(58) Field of Classification Search ............... 345/418, 345/428, 581, 589, 588, 597, 604–605, 545, 345/549, 555, 582; 382/162, 166, 167, 218, 382/232–235; 358/515, 518
See application file for complete search history.

(56) References Cited

U.S. PATENT DOCUMENTS

| 6,366,289 | B1 | 4/2002 | Johns | |
|---|---|---|---|---|
| 6,750,875 | B1 | 6/2004 | Keely, Jr. et al. | |
| 6,825,847 | B1 | 11/2004 | Molnar et al. | |
| 2003/0016226 | A1* | 1/2003 | Lu et al. ................ | 345/555 |
| 2003/0179925 | A1* | 9/2003 | Hsu ........................ | 382/166 |

FOREIGN PATENT DOCUMENTS

| JP | 07-046409 | 2/1995 |
|---|---|---|
| JP | 07-170410 | 7/1995 |
| KR | 10-1998-015459 | 11/1998 |

* cited by examiner

Primary Examiner—Wesner Sajous
(74) Attorney, Agent, or Firm—Myers Bigel Sibley & Sajovec PA

(57) ABSTRACT

Graphics display systems include a graphics data compression circuit having a data encoder therein. The data encoder is configured to compress second color graphics data to be rendered as a second pixel of a display into a data string containing a data field and a header field. The header field contains at least one repetition flag that identifies a degree to which components of the second color graphics data match corresponding components of first color graphics data to be rendered as a first pixel of the display.

28 Claims, 7 Drawing Sheets

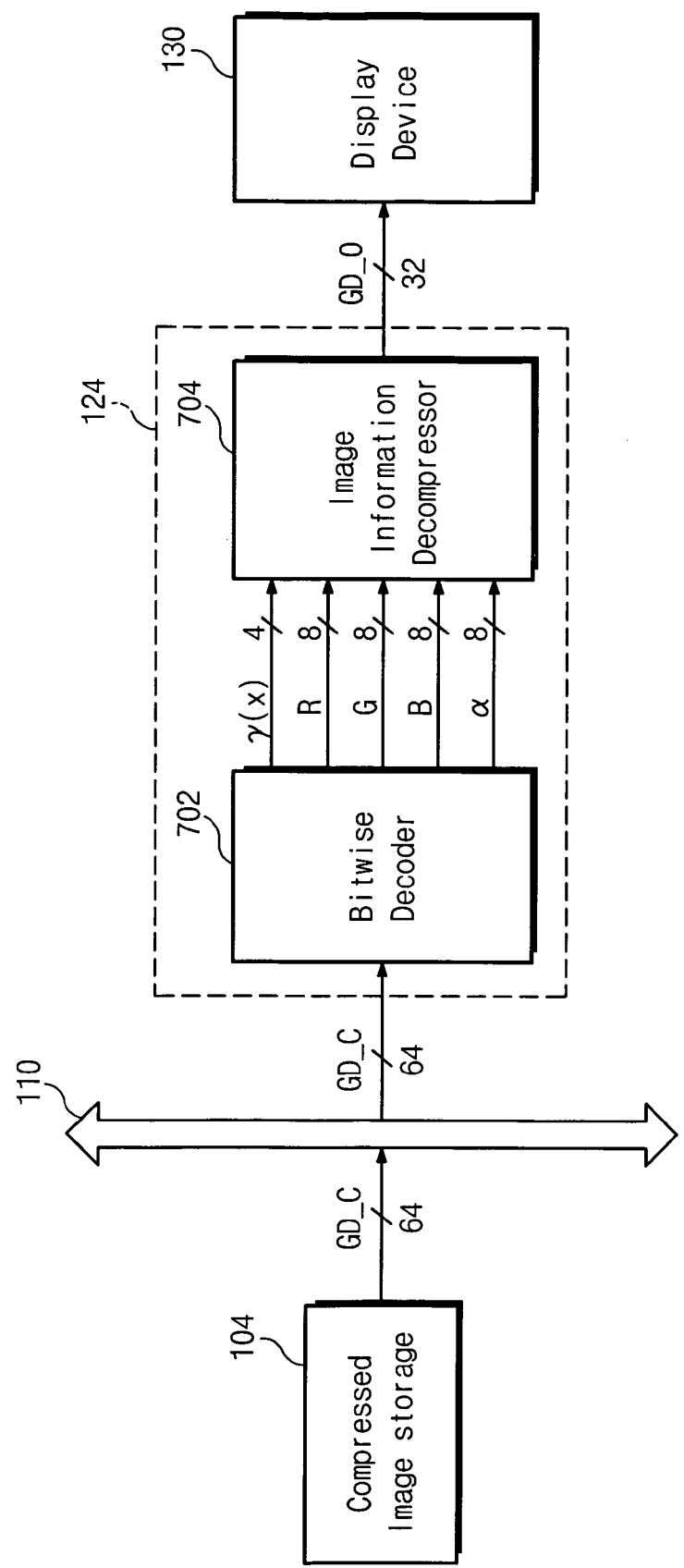

GRAPHICS DISPLAY SYSTEMS WITH DATA COMPRESSION AND METHODS OF PERFORMING DATA COMPRESSION OF GRAPHICS DATA

REFERENCE TO PRIORITY APPLICATION

This application claims priority to Korean Patent Application No. 2004-38711, filed May 29, 2004, the disclosure of which is hereby incorporated herein by reference.

FIELD OF THE INVENTION

The present invention relates to display systems and display methods and, more particularly, to systems that utilize data compression/decompression techniques when rendering objects on a display.

BACKGROUND OF THE INVENTION

The processing and display of large quantities of graphics data in real time typically requires the use of high bandwidth processors, buses and storage elements (e.g., memories). For example, the rendering of graphics data on conventional displays often requires 32 bits of data per pixel to achieve high fidelity images with accurate color. As the sizes of displays and the number of pixels rendered on displays increases, there is a corresponding increase in the bandwidth requirements of components within display systems that perform graphics rendering operations. To reduce these bandwidth requirements, techniques have been developed to reduce the amount of data required to render images on a display for those instances where pixel color and/or pixel intensity values of adjacent pixels is equivalent. Some of the techniques for compressing data are described in U.S. Pat. No. 6,825,847 to Molnar et al., U.S. Pat. No. 6,750,875 to Keely et al. and U.S. Pat. No. 6,366,289 to Johns.

SUMMARY OF THE INVENTION

Graphics display systems with data compression include graphics data compression circuits. These circuits include a data encoder. This data encoder is configured to compress second color graphics data to be rendered as a second pixel of a display into a data string containing a data field and a header field. The header field contains at least one repetition flag. This repetition flag identifies a degree to which components of the second color graphics data match corresponding components of first color graphics data to be rendered as a first pixel of the display. The data encoder is further configured to concatenate compressed data strings having different length header and data fields into a fixed-length data string. The data encoder may also be configured to compress third color graphics data to be rendered as a third pixel of the display into a data string containing an M-bit header field and a zero-length data field. The compression technique applies for those cases where the third pixel and the second pixel are immediately adjacent pixels and the third color graphics data matches the second color graphics data exactly.

The graphics data compression circuit may also include an image component comparator. This comparator is configured to generate at least one color-coded repetition flag. This flag indicates a degree to which a color component of the second color graphics data matches a corresponding color component of the first color graphics data. A decoder may also be provided. The decoder is configured to decode the fixed-length data string into at least first multi-colored graphics data associated with one pixel of the display and second multi-colored graphics data associated with another pixel of the display.

According to additional embodiments of the invention, a data encoder may be provided within a graphics data compression circuit. This encoder is configured to compress second color graphics data to be rendered as a second pixel of a display into a data string containing a data field and a header field. The header field contains a repetition flag that identifies whether or not all components of the second color graphics data match corresponding components of first color graphics data to be rendered as a first pixel of the display.

Still further embodiments of the invention include methods of generating graphics data to be rendered on a display. These methods include encoding second multi-colored graphics data associated with a second pixel of the display into a compressed data string containing a data field and a header field. The header field contains at least one repetition flag that identifies a degree to which components of the second multi-colored graphics data match corresponding components of first multi-colored graphics data associated with a first pixel of the display that is immediately adjacent the second pixel.

BRIEF DESCRIPTION OF THE DRAWINGS

FIG. 7 is a block diagram that illustrates components of the graphics display system of FIG. 1 that relate to data decompression.

DESCRIPTION OF THE PREFERRED EMBODIMENTS

Figure 1:
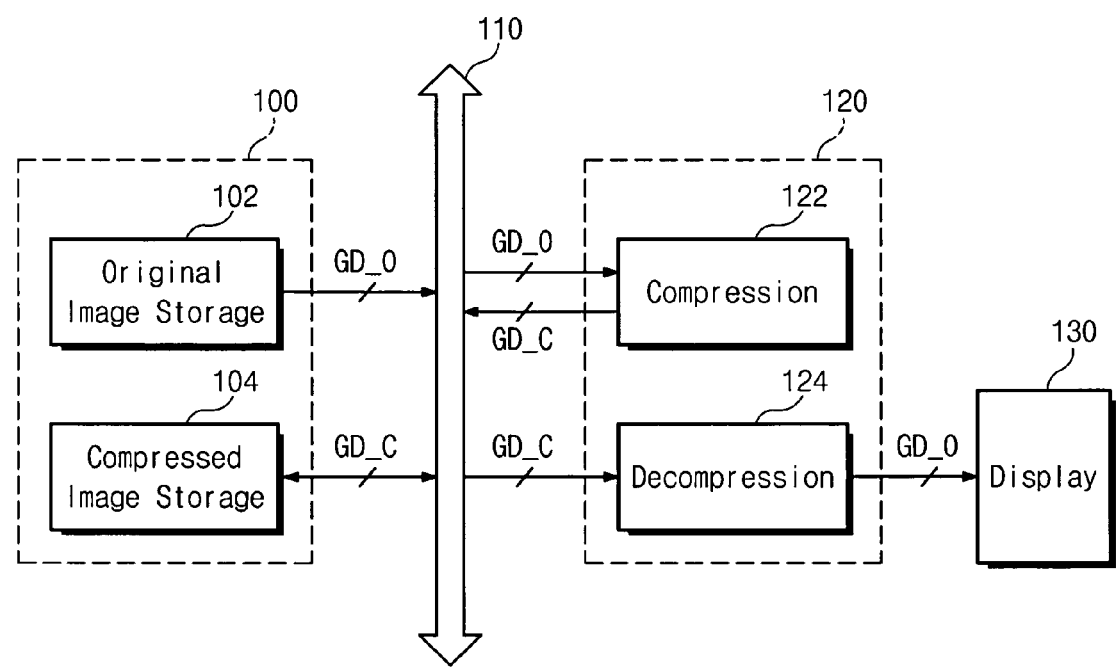
FIG. 1 is a block diagram of a graphics display system according to embodiments of the present invention.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

Referring now to FIG. 1, a graphics display system according to some embodiments of the present invention includes a data storage device 100, a data bus 110, a data compression/decompression device 120, and a display 130. The data storage device 100 is illustrated as including an original image storage device 102 and a compressed image storage device 104. This original image storage device 102 is configured to store graphics data (e.g., pixel display data) in an uncompressed format and the compressed image storage device 104 is configured to store graphics data in a compressed format. The data compression/decompression device 120 is illustrated as including a data compression device 122 and a data decompression device 124. This data compression device 122 may operate as part of a graphics accelerator and the data decompression device 124 may operate as part of a graphics data mixer.

As illustrated, the data bus 110 is configured to communicate original graphics data GD_O from the original image storage device 102 to an input of the data compression device 122 and return compressed graphics data GD_C from the data compression device 122 to the compressed image storage device 104. The data bus 110 is also configured to pass compressed graphics data GD_C from the compressed image storage device 104 to the data decompression device 124 during operations to display the graphics data on the display 130. The data decompression device 124 generates a version of the original graphics data GD_O from the compressed graphics data GD_C. This version of the original graphics data GD_O is then passed to the display 130 for reproduction on a screen of the display.

Figure 2:
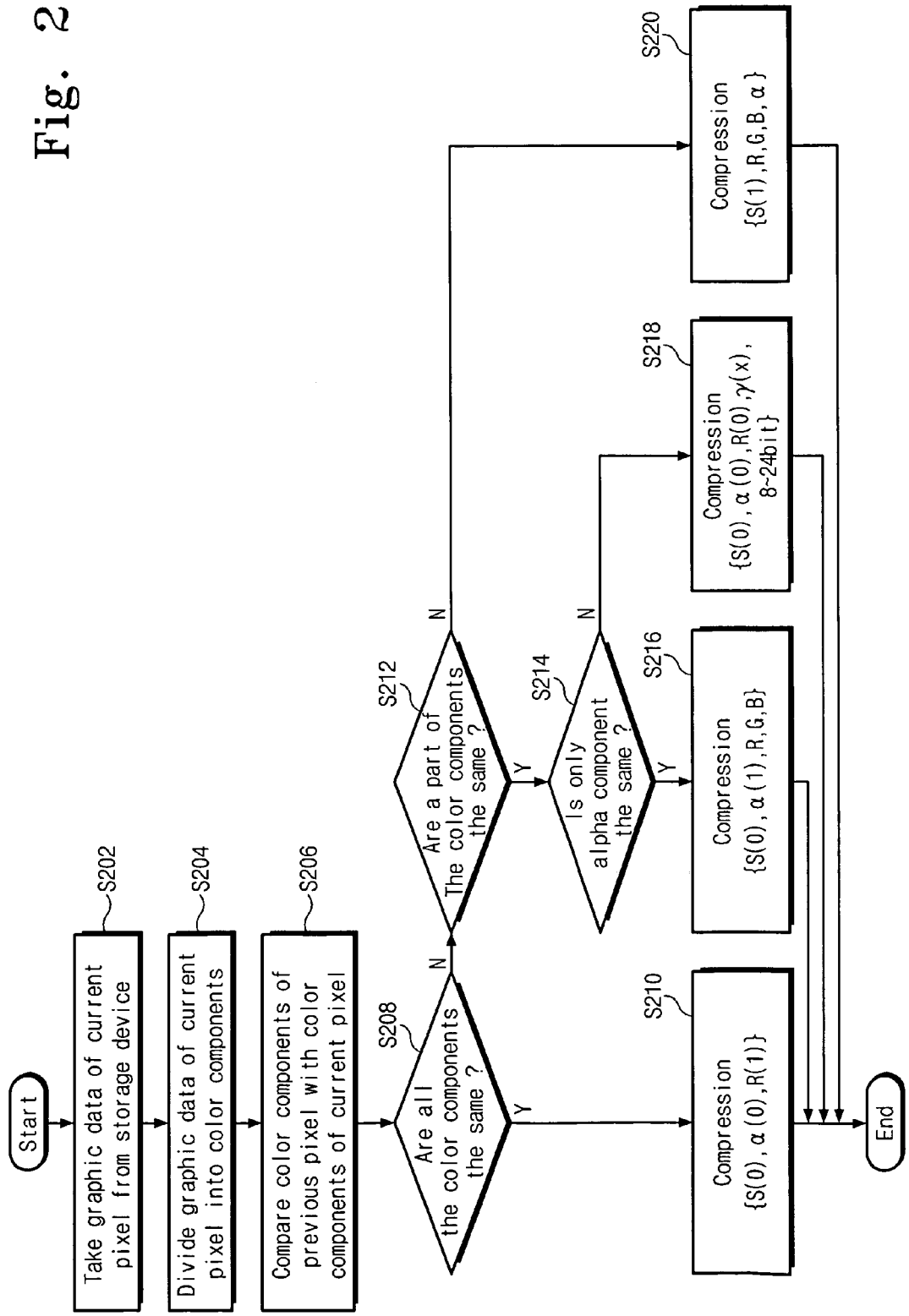
FIG. 2 is a flow diagram that illustrates operations to compress graphics display data according to embodiments of the present invention.
Figure 3:
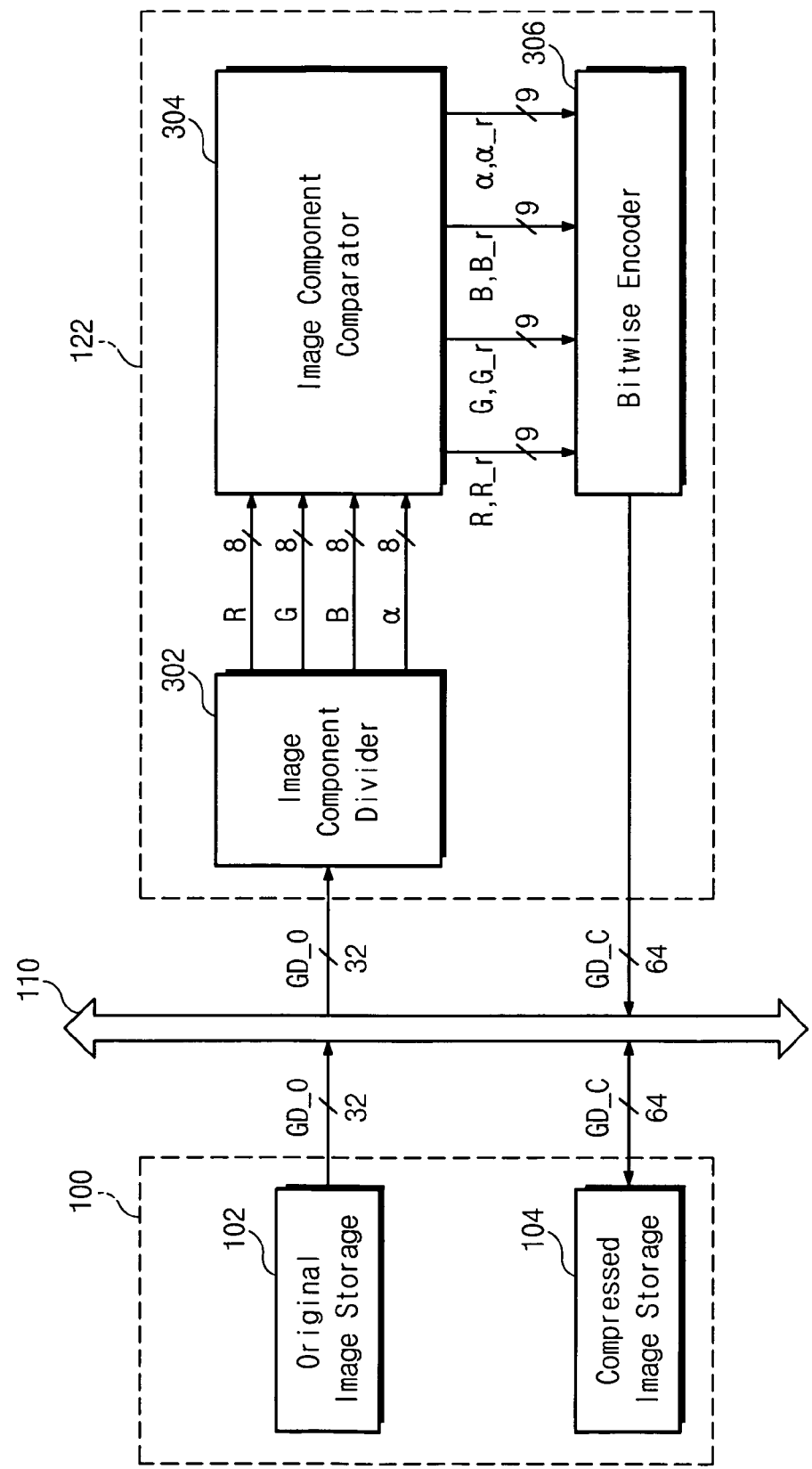
FIG. 3 is a block diagram that illustrates components of the graphics display system of FIG. 1 that relate to data compression.

Referring now to FIGS. 2–3 and TABLE 1, operations and devices for compressing graphics data according to some embodiments of the present invention will be described. These operations exploit certain characteristics of graphics display data that derive from the similarities in color and transparency (or opaqueness) intensity of adjacent pixels on a display screen. In particular, FIGS. 2–3 illustrate operations to transfer original graphics data GD_O (e.g., 32 bpp (bits/pixel)) from the original image storage device 102 to an image component divider 302 within the data compression device 122, Block S202. The image component divider 302 separates the data associated with each pixel into red (R), green (G), blue (B) and alpha (α) components, which are shown as 8-bit pixel data components, Block S204. As will be understood by those skilled in the art, the alpha components relate to a degree of transparency (or opaqueness) associated with a pixel. The separated components are passed to an image component comparator 304, Block S206, which compares the separate red, green, blue and alpha components for a current pixel (i.e., current 8-bit R, G, B and α values generated by divider 302) with the red, green, blue and alpha components of a prior pixel (i.e., immediately preceded 8-bit R, G, B and α values generated by the divider 302), which will ultimately be displayed on a display screen in a location adjacent the current pixel.

As illustrated, the image component comparator 304 generates four 9-bit vectors in response to each grouping of divided pixel data generated by the divider 302. The four 9-bit vectors include: (R, R_r), (G, G_r), (B, B_r) and (α, α_r). The single bit repetition flags R_r, G_r, B_r and α_r within these 9-bit vectors identify whether a component of the current pixel data matches a corresponding component in the prior pixel data and the 8-bit values R, G, B and α represent the current pixel data components. Thus, if the repetition flag values R_r, G_r, B_r and α_r equal 1,0,0 and 1, respectively, where "1" indicates a match, then the R and α pixel data values for the current pixel match the corresponding values of the prior pixel.

The four 9-bit vectors (R, R_r), (G, G_r), (B, B_r) and (α, α_r) are provided to a bitwise encoder 306, which is configured to perform the encoding operations illustrated by Blocks S208–S220 of FIG. 2 and TABLE 1. In particular, at Block S208, a check is made to determine whether all the color components for the current pixel match the corresponding color components of the prior pixel. This check involves determining whether all repetition flags have been set (i.e., (R_r,G_r,B_r,α_r)=(1,1,1,1)). If the answer to this check is "yes", then control is passed to Block S210 and the bitwise encoder generates a highly compressed 3-bit vector as {S=0, α=0, R=1}, where the values S, α and R each represent a repetition flag. If the answer to this check is "no", then control is passed to Block S212, where another check is performed to determine whether any of the color components for the current pixel match corresponding color components of the prior pixel. This check involves determining whether any of the repetition flags have been set (i.e., whether any of R_r, G_r, B_r or α_r equals 1). If the answer to this check is "no", then control is passed to Block S220 and the bitwise encoder 306 generates a 33-bit vector as {S=1, R_x8, G_x8, B_x8, α_x8} where "x8" designates an 8-bit data string. If the answer to the check at Block S212 is "yes", then control is passed to Block S214. At Block S214, a check is made to determine whether only the α data component of the current pixel is equivalent to the α data component of the prior pixel (i.e., R_r, G_r and B_r equal 0 and α_r equals 1). If the answer to this check is "yes", then control is passed to Block S216 and the bitwise encoder 306 generates a somewhat compressed 26-bit vector as {S=0, α=1, R_x8, G_x8, B_x8}. If the answer to this check at Block S214 is "no", then control is passed to Block S218 and the bitwise encoder 306 generates either a 15-bit, 23-bit or 31-bit vector depending on a degree of similarity in color components. As illustrated by Block S218 and TABLE 1, each of these vectors includes a 4-bit designator γ(x,x,x,x), which uniquely specifies the degree of match between the color components of a current pixel and the color components of the prior pixel. Although not shown in FIGS. 2–3, a 7-bit line finished code (LFF) may also be generated by the bitwise encoder 306. As illustrated by TABLE 1, this 7-bit code, which is represented as {S=0, α=0, R=0, γ(1,1,1,1)}, indicates that the last pixel associated with a line on the display 130 has just been processed and a new line with new data is to follow.

TABLE 1

ENCODED GRAPHICS DATA

| STRING LENGTH (BITS) | COMPRESSED DATA STRING (HEADER & DATA FIELDS) | DESCRIPTION |
| --- | --- | --- |
| 3 | {S(0), α(0), R(1)} | CURRENT PIXEL = PRIOR PIXEL |
| 15 | {S(0), α(0), R(0), γ (0111), R_x8} | RED COLOR CHANGE |
| 15 | {S(0), α(0), R(0), γ (1011), G_x8} | GREEN COLOR CHANGE |
| 15 | {S(0), α(0), R(0), γ (1101), B_x8} | BLUE COLOR CHANGE |
| 15 | {S(0), α(0), R(0), γ (1110), α_x8} | ALPHA CHANGE |

TABLE 1-continued

ENCODED GRAPHICS DATA

| STRING LENGTH (BITS) | COMPRESSED DATA STRING (HEADER & DATA FIELDS) | DESCRIPTION |
| --- | --- | --- |
| 23 | {S(0), α(0), R(0), γ (0011), R__x8, G__x8} | RED & GREEN CHANGE |
| 23 | {S(0), α(0), R(0), γ (0101), R__x8, B__x8} | RED & BLUE CHANGE |
| 23 | {S(0), α(0), R(0), γ (0110), R__x8, α__x8} | RED & ALPHA CHANGE |
| 23 | {S(0), α(0), R(0), γ (1001), G__x8, B__x8} | GREEN & BLUE CHANGE |
| 23 | {S(0), α(0), R(0), γ (1010), G__x8, α__x8} | GREEN & ALPHA CHANGE |
| 23 | {S(0), α(0), R(0), γ (1100), B__x8, α__x8} | BLUE & ALPHA CHANGE |
| 26 | {S(0), α(1), R__x8, G__x8, B__x8} | RED, GREEN & BLUE CHANGE |
| 31 | {S(0), α(0), R(0), γ (1000), G__x8, B__x8, α__x8} | GREEN, BLUE & ALPHA CHANGE |
| 31 | {S(0), α(0), R(0), γ (0100), R__x8, B__x8, α__x8} | RED, BLUE & ALPHA CHANGE |
| 31 | {S(0), α(0), R(0), γ (0010), R__x8, G__x8, α__x8} | RED, GREEN & ALPHA CHANGE |
| 7 | {S(0), α(0), R(0), γ (1111)} | LINE FINISHED (LFF) |
| 33 | {S(1), R__x8, G__x8, B__x8, α__x8} | RED, GREEN, BLUE & ALPHA CHANGE |

Figure 4:
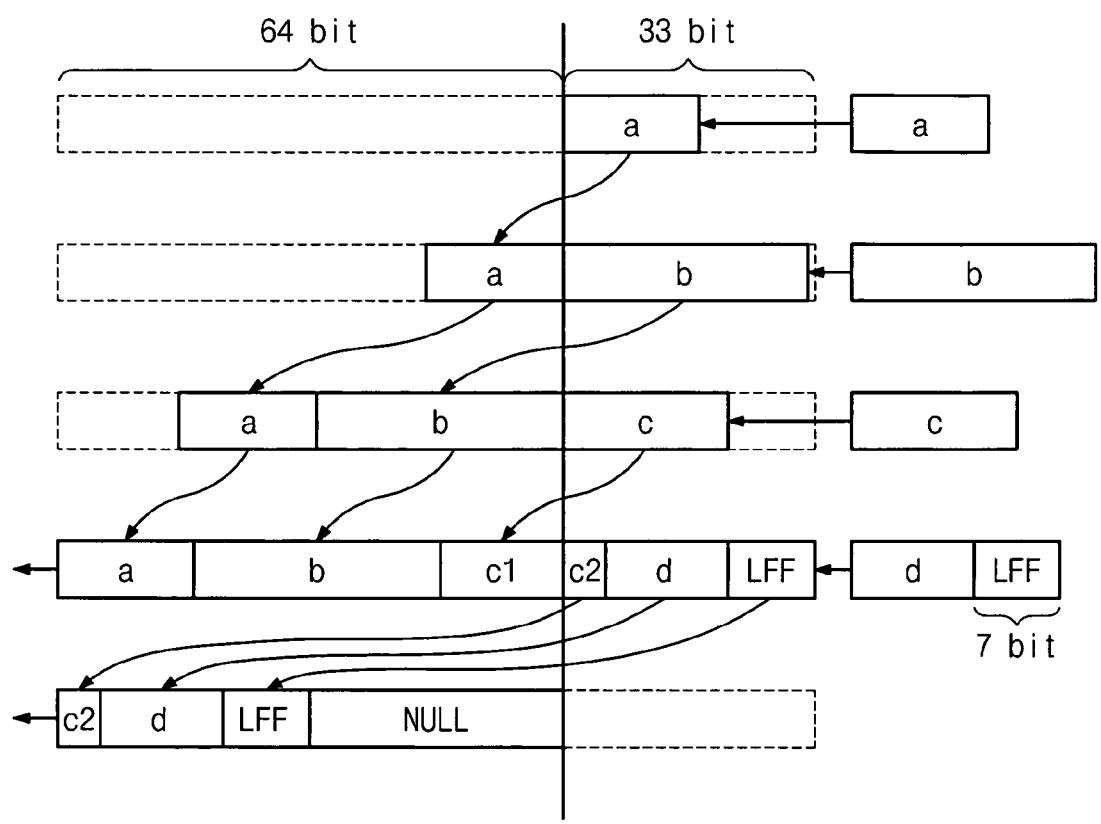
FIG. 4 is a diagram that illustrates placement of a plurality of compressed graphics data strings of various lengths within a fixed length data vector, according to embodiments of the present invention.

As illustrated by FIGS. 3–4, a consecutive sequence of the encoded display data vectors generated by the bitwise encoder 306 may be combined within 64-bit data strings and passed via the data bus 110 to the compressed image storage device 104. As illustrated by TABLE 1, these encoded vectors may have bit lengths equal to 3, 15, 23, 26, 31, 33 or 7 (to indicate a line finished condition). A plurality of these encoded vectors are identified by the labels "a", "b", "c" and "d" in FIG. 4. In particular, vectors "a", "b" and a first portion of vector "c" may be concatenated within a single 64-bit data string and a second portion of the vector "c" and a vector "d" may be concatenated within another 64-bit data string. Moreover, if vector "d" represents a compressed display data vector for the last pixel within a line (e.g., rightmost pixel on line in a display), then a 7-bit line finished code (LFF) may be concatentated after the vector "d", with the remaining portion of the 64-bit data string being a null set of data (i.e., data that is ignored by the data decompression device 124 when the compressed graphics data (CG_D) is read from the compressed image storage device 104).

Figure 5:
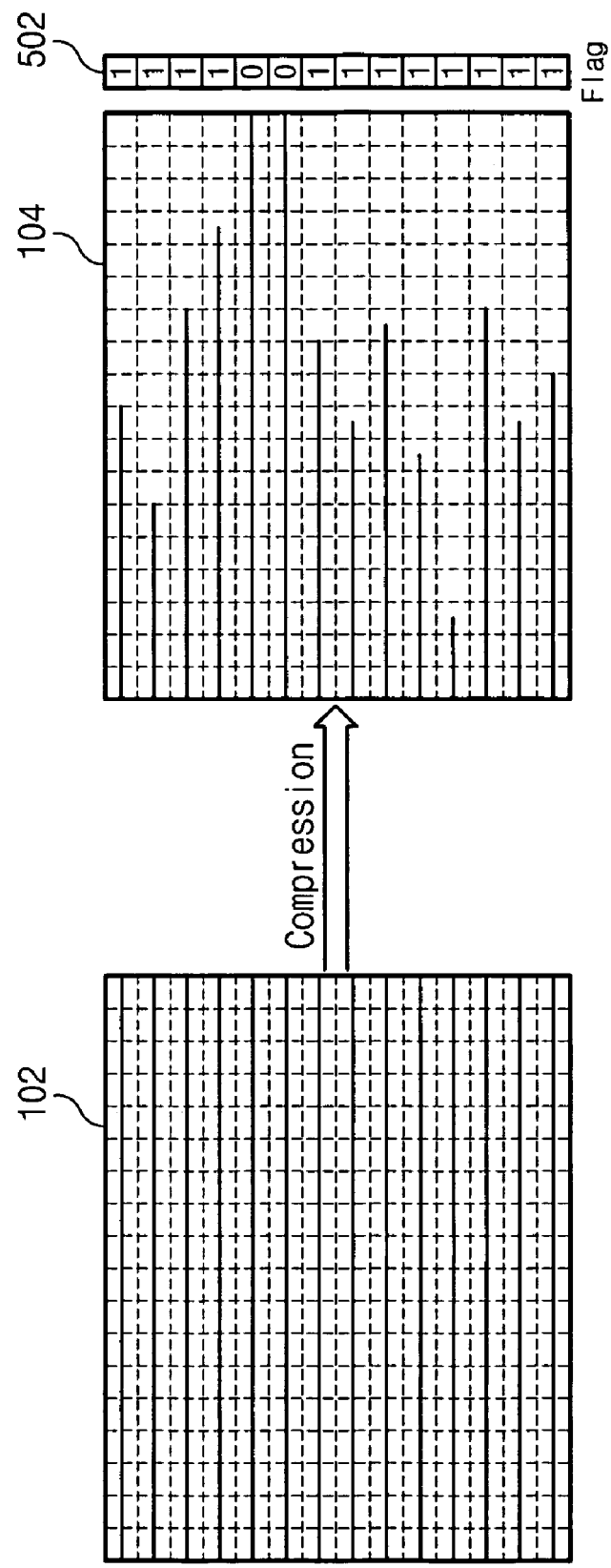
FIG. 5 illustrates an allocation of compressed graphics data strings within the compressed image storage device of FIG. 1.

FIG. 5 schematically illustrates how uncompressed graphics data within an original image storage device 102 may be converted into a smaller quantity of compressed graphics data within a compressed image storage device 104. A flag register 502 associated with the compressed image storage device 104 may also be provided to indicate whether data within a storage line is compressed or not compressed (e.g, flag=1 (compressed), flag=0 (not compressed)).

Figure 6:
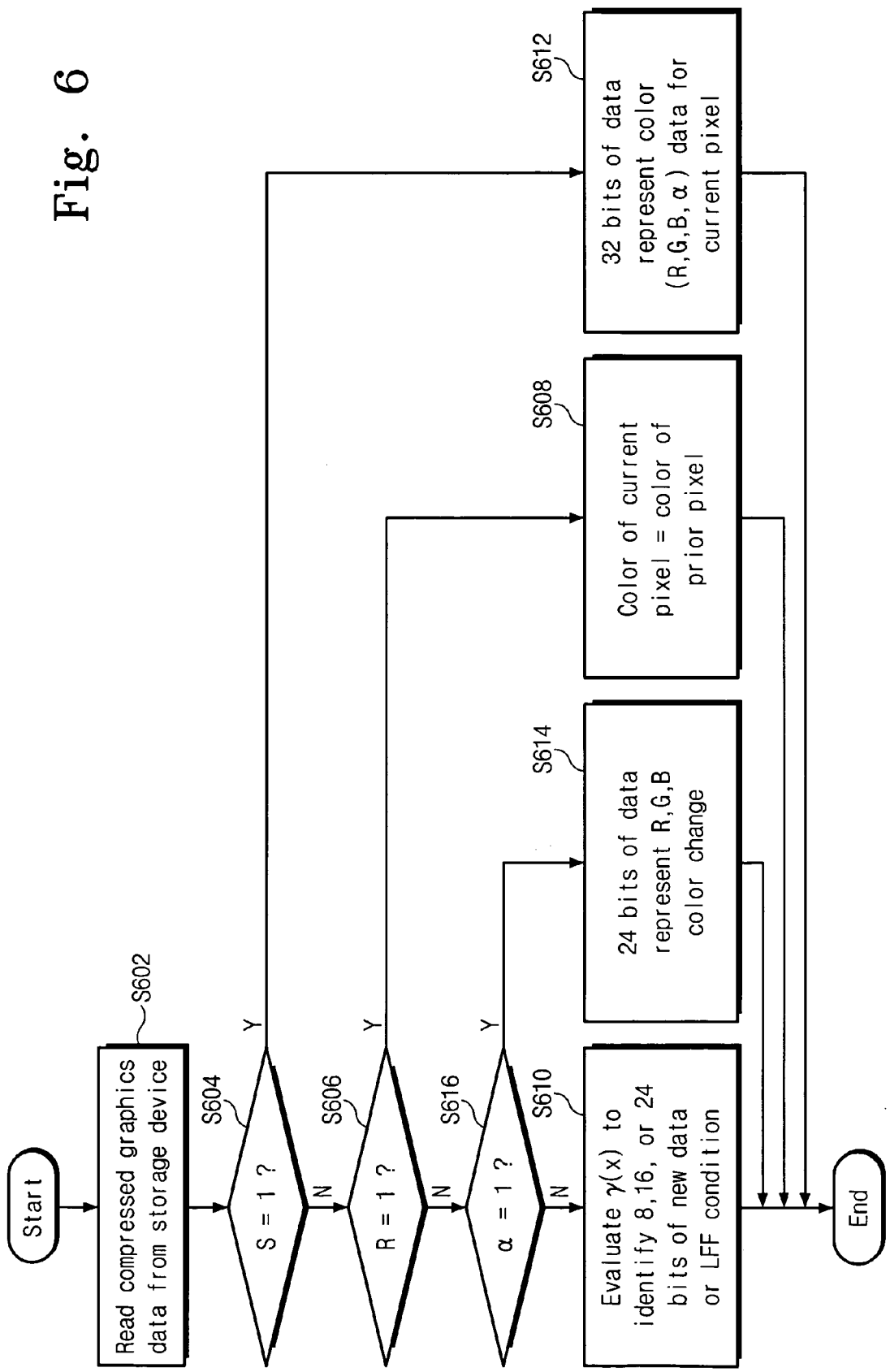
FIG. 6 is a flow diagram that illustrates operations to decompress graphics display data according to embodiments of the present invention.

Referring now to FIGS. 6–7, operations to display graphics data on the display device 130 include reading compressed data from the compressed image storage device 104 to a bitwise decoder 702 within the decompression device 124, Block S602. This bitwise decoder 702 evaluates each of the headers within a 64-bit data string to identify whether any of the header values S, R or α equal 1. If the header value S equals 1, Block S604, then the next 32 bits of data following this header value within the data string represent new red (R), green (G), blue (B) and alpha (α) values for a corresponding pixel, Block S612. These 32 bits of data are passed from the bitwise decoder 702 to an image information decompressor 704 as four 8-bit vectors. In addition, a 4-bit designator γ(x) is ignored by the image information decompressor 704. Alternatively, if the header value R=1, Block S606, then the bitwise decoder 702 will pass a copy of the pixel data for the prior pixel as the pixel data for the current pixel to the image information decompressor 704, Block S608. In contrast, if the header value α=1, Block S616, then the bitwise decoder 702 will pass new red, green and blue data for the current pixel and a copy of the alpha data for the prior pixel, which equals the alpha data for the current pixel, to the decompressor 704, Block S614. Finally, if none of the header values S, R or α have been set, then the bitwise decoder 702 evaluates the 4-bit designator γ(x) to determine which data values for the current pixel represent new values and which represent copies from the prior pixel, Block S610. Alternatively, if none of the header values S, R or α have been set and the 4-bit designator γ(x)=(1,1,1,1), then the decompressor 704 recognizes a line finished condition and the beginning of a new line on the display device 130.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A graphics data compression circuit, comprising:
a data encoder configured to compress second color graphics data to be rendered as a second pixel of a display into a data string containing a data field and a header field, said header field containing at least one repetition flag that identifies a degree to which components of the second color graphics data match corresponding components of first color graphics data to be rendered as a first pixel of the display.

2. The graphics data compression circuit of claim 1, wherein said data encoder is further configured to concatenate compressed data strings having different length header and data fields into a fixed-length data string.

3. The graphics data compression circuit of claim 1, wherein said data encoder is further configured to compress third color graphics data to be rendered as a third pixel of the display into a data string containing an M-bit header field and a zero-length data field for those cases where the third pixel and the second pixel are immediately adjacent pixels and the third color graphics data matches the second color graphics data exactly.

4. The graphics data compression circuit of claim 1, further comprising:
an image component comparator configured to generate at least one color-coded repetition flag that indicates a degree to which a color component of the second color graphics data matches a corresponding color component of the first color graphics data.

5. The graphics data compression circuit of claim 2, further comprising:
a decoder configured to decode the fixed-length data string into at least first multi-colored graphics data associated with one pixel of the display and second multi-colored graphics data associated with another pixel of the display.

6. A graphics data compression circuit, comprising:
a data encoder configured to compress second color graphics data to be rendered as a second pixel of a display into a data string containing a data field and a header field, said header field containing a repetition flag that identifies whether or not all components of the second color graphics data match corresponding components of first color graphics data to be rendered as a first pixel of the display.

7. A method of generating graphics data to be rendered on a display, comprising the steps of:
encoding second multi-colored graphics data associated with a second pixel of the display into a compressed data string containing a data field and a header field, said header field containing at least one repetition flag that identifies a degree to which components of the second multi-colored graphics data match corresponding components of first multi-colored graphics data associated with a first pixel of the display that is immediately adjacent the second pixel.

8. A method of compressing graphic data, wherein color components of a current pixel are compared with color components of a previous pixel such that, when one or more color components are the same among the color components of the current pixel and the color components of the previous pixel, the current pixel is compressed to a header portion including information on the color components that are the same and a data portion including the data values of the color components of the current pixel.

9. The method as set forth in claim 8, wherein, when the color components of the current pixel are completely different from the color components of the previous pixel, the current pixel is compressed to a header portion including information that represents that the color components of the current pixel and the color components of the previous pixel are completely different and a data portion including the data items of all the color components of the current pixel.

10. The method as set forth in claim 8,
wherein the color components comprise red, green, blue, and alpha components, and
wherein the alpha component represents the transparency of the corresponding pixel.

11. The method as set forth in claim 8, wherein the header portion comprises:
a single flag that shows whether the current pixel is completely different from the previous pixel;
an entire repetition flag that shows whether all the color components of the current pixel are the same as all the color components of the previous pixel; and
a repetition flag of each component that shows whether each color component of the current pixel is the same as each color component of the previous pixel.

12. The method as set forth in claim 11, wherein, when all the color components of the current pixel are the same as all the color components of the previous pixel, the current pixel is compressed by only the value of the entire repetition flag.

13. The method as set forth in claim 11, wherein the header portion further comprises an additional alpha flag that shows whether only the alpha component is the same among the color components of the current pixel and the color components of the previous pixel.

14. The method as set forth in claim 13, wherein, when only the alpha component is the same among the color components of the current pixel and the color components of the previous pixel, the current pixel is compressed to the header portion including the alpha flag value and the data portion including the data values of the red, green, and blue color components.

15. The method as set forth in claim 14, wherein the repetition flag of each component is not comprised in the header portion.

16. The method as set forth in claim 8, wherein the compressed current pixel is decompressed such that the repeated color components are decompressed using the color components of the previous pixel and that the color components that are not repeated are decompressed using the color components of the current pixel that are included in the data portion of the compressed current pixel in accordance with information on the repeated color components included in the header portion.

17. The method as set forth in claim 8, wherein the compressed pixels are stored in units of a line.

18. The method as set forth in claim 17, wherein, when the size of a line composed of the compressed pixels is larger than the size of a line composed of the pixels that are not compressed, the data items of the line comprised of the pixels that are not compressed are stored.

19. A system for compressing and decompressing graphic data, the system comprising:
a first storage unit for storing graphic data that is not compressed; a second storage unit for storing compressed graphic data;
a bus that is connected to the first storage unit and the second storage unit and that is a transmission channel of data;
a compression unit for reading graphic data that is not compressed from the first storage unit through the bus and for compressing the graphic data to store the compressed graphic data in the second storage unit through the bus; and
a decompression unit for reading the compressed graphic data from the second storage unit through the bus to decompress the compressed graphic data to original graphic data,
wherein the compression unit compares the color components of the current pixel with the color components of the previous pixel among the graphic data that is not compressed such that, when one or more color components are the same among the color components, the current pixel is compressed to a header portion including information on the color components that are the same and a data portion including the data values of the color components that are not the same.

20. The system as set forth in claim 19, wherein, when the color components of the current pixel are the same as the color components of the previous pixel, the compression unit compresses the current pixel by only the flag value that shows that the color components of the current pixel are the same as the color components of the previous pixel.

21. The system as set forth in claim 19, wherein, when the color components of the current pixel are completely different from the color components of the previous pixel, the compression unit adds the flag value that shows that the color components of the current pixel are completely different from the color components of the previous pixel to the data of the current pixel to compress the data.

22. The system as set forth in claim 19, wherein, when only the alpha component that represents transparency is the same among the color components, the compression unit compresses the current pixel to a header portion including an additional flag value that shows only the alpha component is the same and a data portion including the data values of the other color components excluding the alpha component.

23. The system as set forth in claim 19, wherein the compression unit comprises:
   an image information divider for dividing the graphic data of the current pixel taken from the first storage unit through the bus into color components;
   an image component comparator for comparing the divided color components of the current pixel with the color components of the previous pixel such that repetition information that shows whether each color component is the same is included in the respective color components and that the color components are output; and
   a bitwise encoder for compressing the current pixel to store the current pixel in the second storage unit through the bus when one or more color components among the color components of the current pixel are the same as the color components of the previous pixel in accordance with repetition information from the image component comparator.

24. The system as set forth in claim 23, wherein the bitwise encoder stores the compressed pixels in the second storage unit through the bus when the compressed pixels have a predetermined size.

25. The system as set forth in claim 19, wherein the first storage unit and the second storage unit store the graphic data in additional regions in units of a line.

26. The system as set forth in claim 25, wherein, when the size of the compressed line data is larger than the size of the line data that is not compressed, the line data that is not compressed is stored in the second storage unit.

27. The system as set forth in claim 26, wherein the second storage unit further comprises a flag register that shows whether the line data items stored in the respective regions are compressed.

28. The system as set forth in claim 19, wherein the decompression unit comprises:
   a bitwise decoder for reading compressed graphic data from the second storage unit through the bus to output the compressed graphic data such that the header portion and the data portion of the current pixel are separated from the compressed graphic data; and
   an image information decompressor for decompressing the current pixel such that the repeated color components are decompressed using the color components of the previous pixel and that the color components that are not repeated are decompressed using the color components included in the data portion in accordance with information on the header portion input from the bitwise decoder.

* * * * *